April 25, 1967    H. D. SULLIVAN ETAL    3,316,025
PNEUMATIC CONVEYING SYSTEM FOR CROP HARVESTING DEVICES
Filed June 23, 1965                                    2 Sheets-Sheet 1
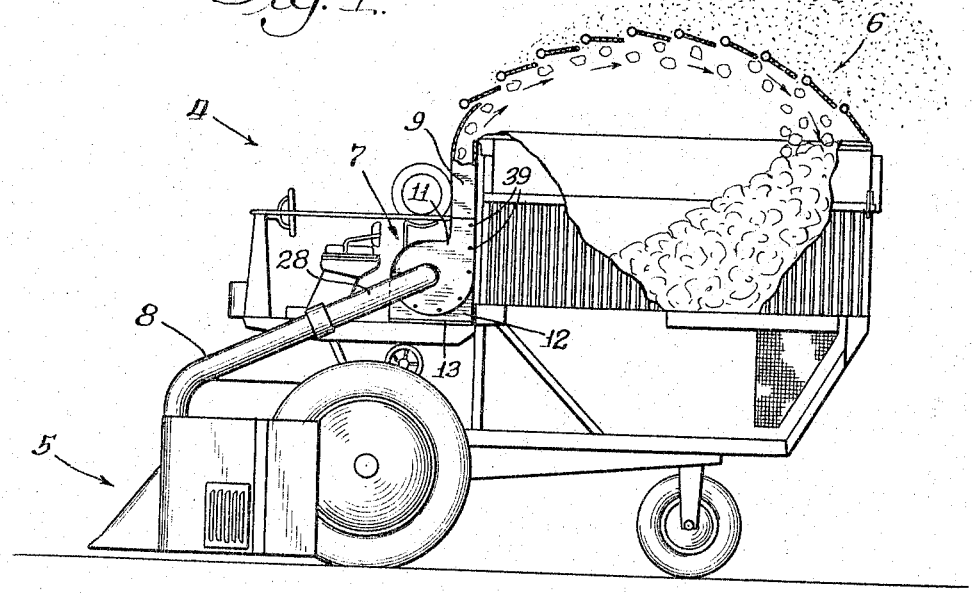

Inventors:
Herbert D. Sullivan
Perry J. Isbell
By John J. Kowalik
Atty.

United States Patent Office 3,316,025
Patented Apr. 25, 1967

3,316,025
PNEUMATIC CONVEYING SYSTEM FOR CROP HARVESTING DEVICES
Herbert D. Sullivan, Chicago, Ill., and
Perry T. Isbell, Memphis, Tenn.
Filed June 23, 1965, Ser. No. 466,270
18 Claims. (Cl. 302—37)

The present application is a continuation-in-part of our co-pending application, Ser. No. 428,064, filed Jan. 26, 1965, now abandoned, for Fan Construction.

The present invention is applicable generally to crop harvesting devices, and particularly applicable to cotton pickers, although of course not limited to the latter.

The invention, as applicable to a cotton picker, is directed to means for conveying seed cotton, or cotton bolls from the picking units of the picker to the storage basket thereof, and more particularly means utilizing an air stream for so conveying the cotton.

A broad object of the invention is to provide a novel crop harvesting device, such as a cotton picker, having means for producing an air stream for conveying the picked cotton to a storage basket, wherein means is provided for controlling the characteristics of the air stream to accommodate the condition of the crop being harvested.

Cotton varies in volumetric and weight characteristics, as well as other characteristics, under different conditions. For example, the cotton bolls vary according to different weather and climatic conditions, such as different humidity conditions, assuming different volumetric and weight characteristics in the different humidity conditions. The cotton may be affected by the general humidity of the air, as well as by rainfall. Cotton also varies from one year or season to the next, and even in different pickings in the same season. In the case of different pickings in the same season, the cotton that is picked later in the season has distinctly different characteristics than that picked in a first or second picking, for example. Again, cotton varies in different geographical areas, and more locally, it often varies in different fields in the same general area.

In any case where the characteristics of the cotton vary, it must be treated differently in the handling thereof such as in conveying it from the picking unit to the storage basket. When it is so conveyed by an air stream, as is virtually universally done, it must be impelled with sufficient force to elevate and carry it to the basket, but it should not be thrown too hard, since, if it is, the seeds may be broken and the cotton fibers thereby stained, with consequent serious damage thereto. Also if the cotton is handled too roughly, as by a rotor or impeller in a fan, or thrown too hard, the fibers may be twisted or knotted, requiring an extra combing operation which is of course expensive, and moreover combing tends to damage the fibers.

Another broad object therefore is to provide a crop harvester, such as a cotton picker, having a picking unit and a storage basket, and means for producing an air stream for carrying the cotton from the picking unit to the storage basket, having means for varying the pressure of the air stream and consequent speed of conveying the cotton.

Another and more specific object is to provide a cotton picker of the foregoing general character in which the means for varying the pressure of the air stream is of simple construction and can be adjusted in a simple manner, whereby a single cotton picker as put out by a manufacturer can be adapted to different areas in which the characteristics of the cotton vary as between areas, and also such that can be easily and quickly adjusted by the operator whereby to accommodate it to local and changing conditions.

Still another object is to provide in a cotton picker, means for producing an air stream including a fan having a housing with a rotor therein, in which the housing includes an outer peripheral wall element of yieldable and flexible nature whereby the cotton on being thrown radially outwardly by the rotor impinges on the yieldable and flexible wall element, and thereby results in the elimination of damage to the cotton seeds.

Still another, and more specific, object is to provide a cotton picker of the foregoing character which utilizes a fan for producing the air stream, the fan incorporating an impeller and a housing having axially opposed side wall members and in which the inlet of the fan is on the axis thereof, and further in which the adjustments referred to for varying the air stream are accomplished by adjusting the axially opposed side wall members toward and from each other.

Still another and specific object is to provide a cotton picker of the character just referred to, utilizing novel and simple adjusting means for adjusting the side wall members of the fan.

An additional object is to provide a cotton picker of the character just referred to in which the fan housing includes a flexible wall element between the side wall members of the fan for accommodating axial adjustments of such side wall members to vary the operating characteristics of the fan in accordance with the instant requirements.

Another broad object is to provide, in a cotton picker, fan means for producing an air stream for conveying cotton, having novel construction preventing build-up or accretion of cotton or plant matter therein.

Another and more specific object is to provide, in a cotton picker, a fan unit for producing an air stream which includes a housing and rotor therein, wherein the housing includes at least one wall that is yieldable and flexible which because of that nature is vibrated and thereby prevents the build-up and accretion of cotton and other plant matter in the fan.

Other objects and advantages of the invention will appear from the following detail description taken in conjunction with the accompanying drawings in which—

FIGURE 1 is a side view of a cotton picker, principally in elevation but partially in section, incorporating the novel features of the present invention;

FIGURE 2 is an edge elevational view of the fan means for producing the air stream for conveying the cotton from the picking unit to the storage basket;

Figure 3:
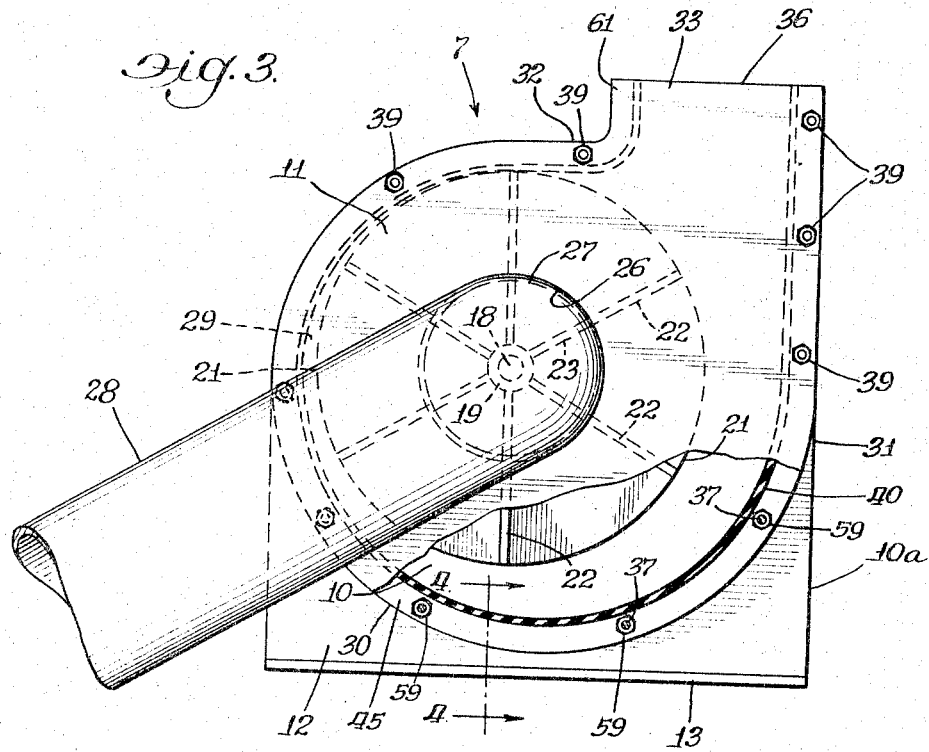
FIGURE 3 is a side elevational view of the fan, taken from the right of FIGURE 2.
Figure 4:
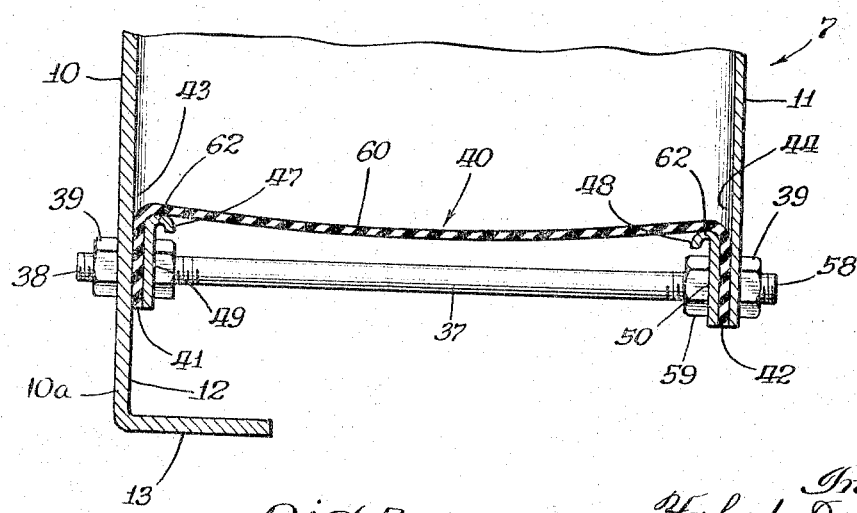
FIGURE 4 is a large scale sectional view taken at line 4—4 of FIGURE 3.

Referring now in detail to the drawings, attention is directed first to FIGURE 1 showing a cotton picker in its entirely at 4 which, except for the novel features referred to hereinbelow, may be of any suitable kind. Such picker is adapted for traveling along the rows of cotton plants and has a pair of picking units 5, one of which is shown, and a storage basket 6. As the picker moves along the plant rows the seed cotton is picked therefrom by known kind of apparatus as shown in U.S. Patent 2,140,631, dated Dec. 20, 1938, and doffed therefrom in the picking units 5 and carried to the storage basket 6. The cotton is so carried by an air stream produced by a fan or blower 7 the details of which are shown in FIGURES 2, 3 and 4 and described hereinbelow. One such fan is provided for each picking unit 5, but these fans are identical or symmetrical and a description of one will suffice for both. A first line or conduit 8 leads from the interior of each picking unit 5 and communicates with the fan through an axial inlet thereof. A second line or conduit 9 communicates with a tangential outlet opening of the fan and leads to the basket 6. The fan produces a vacuum or rarified air condition in the intake line 8 and a pressure condition in the outlet line 9, developing an air stream which thus flows through the lines 8 and 9 as well as the blower, picking up the cotton in the picking unit 5 and carrying it to the storage basket 6. The foregoing operations, in a general way are utilized generally in cotton pickers. The means for controlling the characteristics of the air stream, including the fan 7, is described in detail hereinbelow.

With reference to FIGURES 2, 3 and 4, the fan or blower 7 is shown as having a housing comprising a flat housing plate or member 10. The housing member 10 is disposed in parallel, spaced apart and axially opposed relationship from a flat housing plate or member 11. For the purpose of orientation with respect to the fan, the housing members 10 and 11 are considered as being on and defining opposite sides of the fan. Said housing members 10 and 11 may be fabricated from any suitable metal, such as steel or the like.

As illustrated in the drawings, what has been referred to as the side housing member 10 is an integral part of an enlarged plate 10a having an outer portion 12 which extends beyond housing members 10 and 11. Portion 12 has a right angular flange 13 by means of which the fan may be mounted in any suitable or convenient manner which will be readily apparent to those skilled in the art. One of the housing members, which in the illustrated embodiment is the housing member 10, has extending therethrough a medial aperture. Disposed about said aperture is a flange 15 which is secured in any conventional or suitable manner to the outer surface 14 of the housing member 10. The flange 15 carries a bearing 16 which rotatably supports a power driven shaft 17. The shaft 17 extends through said housing member 10 into the interior of the housing defined by the housing members 10 and 11 transversely of the planes of said housing members.

The inner end portion, or that part 18 of said shaft 17 disposed in the fan housing, has rigidly secured thereon the hub 19 of a fan rotor or impeller generally designated as 20. The rotor 20 includes a rigid rotor plate 21 which is parallel to the member 10 and spaced inwardly slightly therefrom. Rotor plate 21 is rigidly secured to or integral with the hub 19 from which said rotor plate 21 extends radially, normal to the axis of rotation of shaft 17.

The rotor 20 comprises a plurality of radially extending vanes or blades 22, the central or inner end portions 23 of which are rigidly secured to the hub 19. Said vanes 22 are disposed normal to the rotor plate 21 to which their elongated edges 24 are secured, as well illustrated in FIGURE 2. The opposite edges 25 of said vanes 22 are spaced from the housing member 11, as illustrated in FIGURE 2. The vanes 22 at their radially inner ends have inclined edges 25a leading to the hub 19 which is of less axial extent than the vanes, forming a frusto-conical void 25b, facilitating entry of the cotton into the spaces between the vanes.

In the housing member 11, in axial alignment with the shaft 17, is an enlarged inlet aperture 26 which is seen in FIGURE 3. The delivery end 27 of an elbow or tube connector 28 is mounted in said inlet aperture 26. The elbow 28 is connected to or integral with and leads from the line or conduit 8 through which harvested cotton is sucked or drawn from the picking unit 5, as noted above. The cotton is thereupon drawn into a chamber 29 formed between the housing members 10 and 11 through the aperture 26.

As illustrated in the drawings, the member 11 peripherally defines a circular segment 30 which may extend about 300° to points 31 and 32 from which a chute-like materials ejection extension 33 projects. The circular segment 30 is preferably eccentric to the axis of rotation of the shaft 17 and has a radius of curvature longer than the rotor 20. The contour or configuration of member 10 conforms with the contour or configuration of the member 11, including having a materials ejection extension 34, as illustrated in FIGURE 2 which together with extension 33 provides an ejection chamber 35 which communicates with an ejection opening 36 through which materials can be blown from the housing chamber 29. The outer side of the ejection chamber 35 is disposed radially beyond the rotor, on a radius perpendicular with that side, this relation together with the eccentricity of the rotor and members 10 and 11, providing a scroll shape to the chamber 29.

A plurality of ties or spacer bolts 37 connects the opposite housing members 10 and 11 together and rigidly secure them in parallel, axially spaced apart relationship. Like the spacer bolt illustrated in FIGURE 4, each thereof may have a pair of opposite threaded end portions 38 and 58 on each of which there is threaded a pair of opposed lock nuts the outer one of which is numbered 39 and the inner one 59. Housing member 10 is rigidly secured between the lock nuts 39 and 59 mounted on bolt end portions 38, and housing member 11 is rigidly secured between the lock nuts 39 and 59 mounted on bolt end portions 58.

The spacer bolts 37 are disposed parallel to each other and to the longitudinal axis of the shaft 17. Additionally, they may be mounted at substantially equal intervals along substantially the entire peripheral portion 45 of member 11, thereby also being mounted on the member 10 at like intervals along a corresponding portion.

In addition to spaced apart housing members 10 and 11, the fan housing comprises a peripheral wall element 40 in the form of an elongated band which is fabricated from a highly resilient, impact absorbing, preferably flexible material, such as an elastomer which may have fibers impregnated therein. The wall element 40 is disposed between the facing portions of housing members 10 and 11, extending transversely thereof. The wall element 40 has a medial portion 60 and a pair of opposite side portions or flanges 41 and 42 turned outwardly from the medial portion 60 and secured on the spacer bolts 37, the portion 41 being mounted on the end portion 38 against the inner face 43 of the member 10, and the portion 42 being mounted on the end portion 58 against the inner face 44 of member 11. The wall element 40 extends in a path defined by the peripheral portion 45 of the housing members 10 and 11, in surrounding relation to the rotor 20, and with medial portion 60 disposed slightly radially inwardly, or centrally of bolts 37. The opposite ends 46 of the wall element 40 terminate on the housing ejection extension 61 which is formed by the plate extensions 33 and 34. Said ends 46, only one of which is seen in FIGURE 2 define therebetween the ejection opening 36.

A pair of elongated straps or clamps 47 and 48, which are bent or formed to the general contour of the fan housing, are mounted about opposite end portions 38 and 58, respectively, of the bolts 37. Said clamps 47 and 48 have flat sided parts 49 and 50, respectively, which are disposed between respective lock nuts 59 and the extensions 41 and 42 of the wall element. Each of said clamps 47 and 48 also has a rounded or curved integral end portion 62 which engages opposite side portions of the wall element 40 at the junction of the medial portion 60 with a respective one of the flanges 41 and 42. The clamps 47 and 48 are of rigid fabrication, and accordingly when the opposed lock nuts 39 and 59 are tightened, the extensions 41 and 42 are trapped between the respective clamps 47 and 48 and the members 10 and 11 to rigidly secure the wall element 40.

The proximity of the inlet of the fan, as defined by the elbow 28, to the rotor affects the degree of pressure that can be developed by the fan rotor, i.e., the closer the inlet is to the rotor, the greater will be the pressure developed, and conversely the farther away it is, the less will be the pressure. As used herein the pressure may be either negative or positive, and in the case of the negative pressure or vacuum condition, as the inlet is disposed closer to the rotor the greater will be the suction or vacuum produced in the intake line 8, and correspondingly the greater will be the positive pressure developed in the outlet line 9. On the other hand the greater the spacing between the inlet and the rotor the less will be the suction or vacuum in the line 8 and the less positive pressure in the line 9. The bolts 37 may be of any desired length to accommodate the desired range of movement of the housing member 11 axially toward and from the other housing member 10, from an inner position of minimum spacing between the housing members in which the housing member 11 is closely adjacent the outer edges 25 of the vanes, to an outer position of maximum spacing which is unlimited except for practical considerations. The nuts 39 and 59 are correspondingly adjusted on the bolts to so locate the outer housing member 11 according to the desired spacing.

The flexible peripheral wall 40 serves a dual purpose. It accommodates these adjusting movements of the housing members toward and from each other, there being no necessity for making any adjustments in the peripheral wall element.

Another important purpose served by the peripheral wall element 40 is that its flexibility and yieldability eliminate the build-up or accretion of cotton in the fan. The wall element 40 experiences a high degree of vibration due to the impact thereon of the air stream and cotton in the stream, as forced radially outwardly by the rotor. This air stream, together with the cotton bolls or particles therein, causes a constant vibration of the wall element so that any cotton particles that tend to build up or accrete in the fan are dislodged therefrom by that vibration. The size, shape and proportions of the wall element 40 are such that the medial portion 60 thereof is always disposed radially inwardly of the bolts 37, even in the most expanded position thereof as when the housing members 10 and 11 are in their innermost adjusted position and the flexible wall element is expanded by the pressure of the air stream, thereby eliminating any pockets in the medial portion 60 between the bolts. This relationship is easily established by providing the flanges 41 and 42 of the wall element, together with the clamping members 47 and 48, of the desired radial extent.

The yieldability and resilience of the peripheral wall element 40 greatly minimizes seed injury as compared with conventional fans having for example a rigid peripheral wall member. This results in elimination of staining the cotton fibers by the oils in the seeds, and in a greater seed yield.

The frusto-conical void 25b facilitates entrance of the cotton bolls or cotton particles from the elbow 28 into the spaces between the vanes of the rotor, with minimum impact of the cotton with either the vanes of the rotor or the hub thereof, the air stream carrying the cotton particles in a path leading directly into the spaces between the adjacent vanes.

The differential in the vacuum head and the positive pressure developed by the fan, enables control of the conveyance of the cotton from the picking units to the storage basket. Greater pressure may be for example desired in the case of cotton that is heavier than normal, i.e., heavier per unit volume, while on the other hand in the case of drier cotton that is lighter in weight per unit volume, a lesser pressure will be desired.

The fan structure provides a simple and relatively inexpensive device that can be made in a single form by the manufacturer so as to accommodate a wide variation in conditions of cotton that will be encountered. Thus a single cotton picker equipped with the device of the invention may be provided for use in any of the various areas in which cotton is grown. Moreover the device is of such simple nature and the wall members 10 and 11 can be adjusted relative to each other in such a simple manner, that the user or operator can easily and quickly make the desired adjustments, in the field, to accommodate the conditions existing locally, and at the particular time involved. For example, he may wish to make adjustments for one field in his own area relative to another field, or to make adjustments to compensate for weather or humidity conditions such as in handling wet and heavy cotton or relatively dry and light cotton. Additionally he can easily and readily make the desired adjustments as between different pickings in the same season.

While we have disclosed and claimed herein a certain preferred form of the invention it will be understood that changes may be made therein within the spirit and scope of the appended claims.

We claim:

1. In a crop harvester having a picking unit operative for picking crop particles from plants and also having a receptacle for the crop particles, the combination comprising, means for producing a fluid stream and conducting it from the picking unit to the receptacle and comprising a casing with an impeller, said casing having a wall at one side of the impeller with an inlet opening directly axially of the impeller, said wall being adjustable axially of the impeller for varying the pumping action developed by the impeller, the fluid stream being effective for lifting crop particles in the picking unit and carrying them in the stream to the receptacle.

2. In crop harvesting apparatus having a picking unit operative for picking crop particles from plants and also having a receptacle for the crop particles, the combination comprising means for producing an air stream and conducting the stream from the picking unit to the receptacle, the fluid stream being effective for lifting crop particles in the picking unit and carrying them in the stream to the receptacle, the means for producing the fluid stream including a fan having a housing and a rotor operable therein, and the housing having a wall with an axial inlet, said wall being adjustable axially of the fan for varying position of the inlet relative to the fan and thus changing the operating characteristics therein for correspondingly adjusting the pressure of the fluid stream in accordance with the requirements of the condition of the crops to be harvested.

3. In cotton harvesting apparatus of the character disclosed adapted for movement along a row of crop plants and having a picking unit for encountering the plants of the row and operative for picking crop particles from the plants, and also having a receptacle for receiving the crop particles, the combination comprising, means for producing a fluid stream and conducting it from the picking unit to the receptacle, the fluid stream being effective for lifting crop particles in the picking unit and carrying them in the stream to the receptacle, said means for producing the fluid stream including a fan having a housing and a rotor therein, the housing including a pair of axially opposed wall members, one of said wall members having an opening defining an inlet on the axis of the rotor, and the wall members being adjustable axially relatively toward and from each other to vary the pumping action of said means in accordance with the condition of the crops.

4. The invention set out in claim 3 wherein the fan housing includes a peripheral wall element connected between said opposed wall members which is of flexible and yieldable nature, whereby adjustments of the opposed wall members can be effected without requiring changes in the connection between that peripheral wall element and the opposed wall members.

5. In a crop harvesting device adapted to move along a row of crop plants, and having a picking unit adapted to encounter the plants in the row and pick crop particles therefrom, and also having a receptacle for the crop particles, the combination comprising, means for producing an air stream and conducting it from the picking unit to the receptacle, the air stream being effective for lifting crop particles in the picking unit and carrying them in the stream to the receptacle, the means for producing the air stream including a fan having a housing including a wall and a rotor therein, the air stream with the crop particles therein passing through the fan and being thrown by the fan against the housing wall, and that housing wall being of yieldable and flexible nature whereby it absorbs the effect of the impact of the air and the crop particles impinging thereon and said housing having portions adjustable with respect to the fan to vary the pumping characteristics thereon and said portions connected with said flexible housing wall and effective to vary the displacement of said wall with respect to said fan coincidental with adjustment of said portions.

6. The invention set out in claim 5 wherein the fan rotor throws the air stream generally radially outwardly, and said housing wall is a peripheral member substantially surrounding the rotor circumferentially.

7. In a cotton harvester adapted to move along a row of cotton plants and including a picking unit adapted to pick cotton particles from the plants and a storage basket adapted to receive the picked cotton, the combination comprising, a fan unit including a pair of axially spaced opposed housing wall members, bolts interconnecting the housing members at spaced points around the periphery thereof and operative for securing the housing wall members in selectively adjusted, relatively spaced positions, a rotor operatively mounted in the housing on an axis perpendicular to said housing members, and a flexible peripheral wall interconnected between said housing members and substantially surrounding the rotor and defining an exit opening extending substantially tangentially of the rotor, one of said housing members having an inlet opening on the axis of the rotor, an intake vacuum line interconnecting the picking unit and the fan housing at the axial opening of the latter, and an outlet pressure line interconnecting the outlet opening of the housing and the storage basket and said peripheral wall being displaceable with respect to the rotor coincidentally with and pursuant to axial adjustment of said housing wall members.

8. The invention set out in claim 7 in which the fan and the peripheral wall element are disposed eccentric to each other and the opposed housing members and flexible wall element thereby define a scroll shape chamber in the housing, and the outlet opening of the housing extends radially beyond the extremity of the rotor on a radius perpendicular to the remote side of the outlet opening.

9. The invention set out in claim 7 wherein the rotor includes a drive shaft and a plurality of radial vanes, the vanes extending axially in the housing beyond the drive shaft, and the vanes at their radially inner ends having inclined edges from their remote edges diagonally toward the end of the shaft whereby to provide a frusto-conical void in the vanes on the axis of the rotor and thereby facilitate flow of the air stream emerging from the inlet into the spaces between the rotor vanes.

10. Apparatus of the character disclosed comprising in combination, a cotton picker adapted to move along a row of cotton plants and including means for picking cotton particles from the plants, a receptacle for receiving the cotton particles, means for producing an air stream and conducting it from the picking unit to the receptacle, the air stream being effective for lifting cotton particles in the picking unit and carrying them in the stream to the receptacle, and means for adjusting the last means for varying the pressure developed in the air stream and comprising an axially adjustable housing with an axial inlet opening and an impeller having its axis of rotation centered with respect to said inlet opening.

11. A fan comprising a generally cylindrical housing including a pair of opposed side walls and a peripheral wall, and a rotor operable in the housing, the housing having inlet and outlet openings, the opposed side walls being relatively adjustable axially of the housing for varying the pumping characteristics of the fan, and said peripheral wall being adjustable axially incidental to the adjusting of the side walls.

12. The invention set out in claim 11 wherein the peripheral wall is flexible and the adjustability thereof is provided by its flexibility.

13. A fan comprising a generally cylindrical housing and a rotor in the housing, the housing including a pair of axially opposed side walls, one of the side walls having an inlet opening coaxial with the rotor, and the housing having an outlet opening, said one side wall being adjustable relatively toward and from the other side wall along the axis of said rotor to thereby adjust the inlet opening along said axis toward and from the rotor.

14. A fan comprising a generally cylindrical housing including a pair of opposed side walls and a peripheral wall, and a rotor operable in the housing, the housing having inlet and outlet openings, the opposed side walls being relatively adjustable axially of the housing for varying the pumping characteristics of the fan, and said peripheral wall being adjustable axially incidental to the adjusting of the side walls, said peripheral wall being flexible and the adjustability thereof is provided by its flexibility, said flexible peripheral wall being slackened in response to the opposed side walls being drawn together, and bowing outwardly pursuant to impingement of air thereon thrown by the rotor, and the flexible peripheral wall being drawn taut and into a position approximately perpendicular to the planes of the opposed side walls pursuant to the side walls being moved apart.

15. A fan comprising a generally cylindrical housing including a pair of opposed side walls and a peripheral wall, and a rotor operable in the housing, the housing having inlet and outlet openings, the opposed side walls being relatively adjustable axially of the housing for varying the pumping characteristics of the fan, and said peripheral wall being adjustable axially incidental to the adjusting of the side walls, and said peripheral wall being eccentric to the rotor, the rotor at one side sweeping along the peripheral wall, and the peripheral wall forming a generally scroll shape defining a space between the rotor and peripheral wall progressively greater in radial direction.

16. A fan comprising a housing and a rotor operable therein, the housing having axially opposed side walls and a peripheral wall generally surrounding the rotor, the rotor being fixed axially relatively to a first of the side walls, the second side wall having an inlet opening coaxial with the rotor and being movable axially toward and from the other said wall side whereby to correspondingly move the inlet opening toward and from the rotor at the axis thereof.

17. A cotton picker comprising cotton gathering and harvesting means, a storage basket, and pneumatic conveying means leading from the harvesting means to the storage basket, the pneumatic conveying means including a fan having a housing and a rotor operable therein, the housing including a pair of axially opposed side walls and a flexible peripheral wall connected to and between the side walls and generally surrounding the rotor, one of the side walls being adjustable toward and from the opposite side wall and having an inlet opening coaxial with the rotor and in response to movement toward and from the other side wall effecting movement of the inlet opening therein toward and from the eye of the rotor, the housing having an outlet opening, the pneumatic conveying means also including a suction line connecting the harvesting means and the inlet opening of the housing and a pressure line connected between the outlet opening of the housing and the storage basket.

18. The invention set out in claim 17 wherein the peripheral wall element yields and flexes in radial directions pursuant to and for purpose of accommodating relative movements of the side walls toward and from each other, and the outlet opening in the fan housing extends in tangential direction therefrom.

References Cited by the Examiner

UNITED STATES PATENTS

| | | | |
|---|---|---|---|
| 1,604,328 | 10/1926 | Walker | 230—128 |
| 2,115,134 | 4/1938 | Anderson | 302—37 |
| 2,445,111 | 7/1948 | Gouinlock | 302—37 |
| 2,856,858 | 10/1958 | Purcell | 103—112 |
| 3,128,587 | 4/1964 | Nickla | 302—59 |

ANDRES H. NIELSEN, *Primary Examiner.*